United States Patent
Zhu et al.

(10) Patent No.: US 7,315,487 B2
(45) Date of Patent: Jan. 1, 2008

(54) METHOD OF SIGNAL PROCESSING FOR HIGH RESOLUTION BATHYMETRIC SIDESCAN SONAR

(75) Inventors: Weiqing Zhu, Beijing (CN); Xiaodong Liu, Beijing (CN); Wen Xu, Beijing (CN)

(73) Assignee: Institute of Acoustics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 11/490,078

(22) Filed: Jul. 21, 2006

(65) Prior Publication Data

US 2007/0091723 A1    Apr. 26, 2007

(30) Foreign Application Priority Data

Jul. 22, 2005    (CN) .......................... 2005 1 0085511

(51) Int. Cl.
*G01S 15/89* (2006.01)
(52) U.S. Cl. ........................................ 367/88
(58) Field of Classification Search ................ 367/87, 367/88

See application file for complete search history.

(56) References Cited

U.S. PATENT DOCUMENTS

| | | | | |
|---|---|---|---|---|
| 4,939,700 A | * | 7/1990 | Breton | ........................ 367/88 |
| 6,130,641 A | * | 10/2000 | Kraeutner et al. | ............ 367/88 |
| 6,873,570 B2 | * | 3/2005 | Zhu et al. | ..................... 367/88 |

OTHER PUBLICATIONS

Weiqing Zhu et al, "High Resolution Bathymetric Sidescan Sonar", Oceans '02 MTS/IEEE Publication Date: Oct. 29-31, 2002, vol. 1, pp. 223-227 vol. 1.*
Bird et al, "Analysis of Swath Bathymetry Sonar Accuracy", Oceanic Engineering, IEEE Journal of, Apr. 2005, vol. 30, Issue: 2, pp. 372-390.*

* cited by examiner

*Primary Examiner*—Ian J. Lobo
(74) *Attorney, Agent, or Firm*—Perkins Coie, LLP; Manni Li

(57) ABSTRACT

A processing method of this invention relates to an angle of arrival estimation technique, where by a high resolution bathymetric sidescan sonar signal process method it measure the micro-geomorphy of the sea bottom. That is the multi-subarray sub-space fitting method. The invention shows that when the array elements number is fixed, no matter there is mutual coupling or not between array elements, there exists one subarray which has the smallest phase estimation standard deviation, the method of this invention overcomes the phase error caused by mutual coupling and enhances the measurement precision.

5 Claims, 2 Drawing Sheets

METHOD OF SIGNAL PROCESSING FOR HIGH RESOLUTION BATHYMETRIC SIDESCAN SONAR

FIELD OF THE INVENTION

The present invention relates to a method of high resolution sonar signal processing, and particularly relates to a method for processing high resolution bathymetric sidescan sonar signal in order to measuring the micro-geomorphy of the sea bottom by utilizing the DOA (Directions of Arrival) estimation technique.

DESCRIPTION OF THE RELATED ART

In the late 1950s, people started to study and make the sidescan sonar system. The sonar array of the sidescan sonar system has a wide field angle in vertical plane, normally about 100° or even wider, however, it has a narrow field angle in horizontal plane, normally about 1°. The sonar system emits sound pulse signals, and the sea bottom scatters the sound wave back, which are received successively by the sonar system in time order. The sonar system keeps moving forward in the sea and continuously emits sound pulse signals and receives the acoustic echoes, and then a sea bottom sonagram is obtained, which reflects the physiognomy of the sea bottom. The technology of the sidescan sonar has become widely used since its development, and brought significant social and economical benefits in many fields. Not only the sea bottom physiognomy is needed in the scientific practice, but also the landform of the sea bottom is needed, so sidescan sonar and multi-beam echo-sounder are often used together. In order to simplify the equipment and enhance the efficiency, a type of bathymetric sidescan sonar was developed. In the late 1990s, the bathymetric sidescan sonar adopted a multiple parallel linear array to measure the phase difference of the acoustic echoes, one emission being able to receive hundreds to even thousands of depth sounding points, so it has superior resolution in comparison with the multi-beam echo-sounder system. However, there are two vital defects in existing bathymetric sidescan sonars of this type: first of all, it has a poor precision of measurement in the vicinity of the nadir of the sonar system; second, the echo arriving concurrently from different direction can not be differentiated, so that the apparatus can not work normally when multi-path effect exists in a underwater acoustic channel, or the landform is complex.

U.S. Pat. No. 6,873,570 B2 "High resolution bathymetric sonar system and measuring method for measuring the physiognomy of the seabed" entitled to Mr. ZHU Weiqing, Mr. LIU Xiaodong et al. has disclosed two techniques aiming to solve the two defects of the above described bathymetric sidescan sonar. The first one is to adopt a sonar system consisting of multiple equal-spaced parallel linear arrays, with the spacing of adjacent linear arrays between $\lambda$ and $\lambda/2$, where $\lambda$ is the wavelength of the sonar central frequency, and the scan resolution under the sonar system reaches a precision level of high resolution digital echo-sounder. The second one is the automatic measuring of the sea bottom—the multiple sub-array directions of arrival estimation technology, which is provided for extracting sound wave information, including the arrival angle and the amplitude of the sound wave through the time-spatial correlation function matrix of the sonar system, by utilizing the directions of arrival (DOA) estimation technology.

The sonar system receives not only target signals, but also noise signals. The time-spatial correlation function matrix can be decomposed to signal subspace and noise subspace, which are perpendicular to the each other, in a functional space. There are generally two types of signal processing methods based on the correlation function matrix: one is spectrum-based method including a noise subspace method, also called as null-subspace method, with which the performance will be decreased with small sample group, low signal to noise ratio and high signal coherence; one is parameter method including a signal subspace method. The parameter method has a better performance than the spectrum-based method. In U.S. Pat. No. 6,873,570 B2, an automatic sea bottom measuring method—the multiple sub-array directions of arrival estimation is disclosed, which belongs to the signal subspace method, and extracts the direct acoustic echo from sea bottom and overcomes the multi-path signal interference caused by the underwater acoustic channels and the complex landform of the sea bottom. Nevertheless, it does not disclose how to solve the problem of the mutual coupling between the parallel linear arrays.

U.S. Pat. No. 613,041 "Imaging methods and apparatus using model-based array signal processing" entitled to P. Kraeutner et al. adopts the null-subspace, i.e., the noise subspace method of the DOA technology, which acquires a higher resolution than that of the conventional beamforming technology, through the processing of the time-spatial correlation function matrix. However, this patent does not tell the measurement precision in the vicinity of the nadir of the sonar system, and does not study the mutual coupling between the parallel linear array either.

In a paper entitled "Coherent source direction estimation for three-row bathymetric sidescan sonars" by W Xu, Stewart W K., OCEANS'99, MTS/IEEE, Seattle, Wash., 299-304. a method of coherent source direction estimation (CSDE) is disclosed, which has made a simulation for a situation of 3 rows of linear arrays and 2 signal sources, and made a comparison with the ESPRIT (Estimating Signal Parameters via Rotational Invariance Techniques) method. The analog calculation indicates that CSDE method performs well for highly coherent signal sources with an angular space of 10° and the signal to noise rate of above 10 db. Meanwhile, since ESPRIT has a good robustness to the incoherent signal source, it is suggested in this paper to combine the two methods in the application instead of the existing difference phase method.

In conclusion, the disadvantages of the conventional techniques are:

1. High-resolution bathymetric sidescan sonar has very strict requirement for the phase characteristics of the sonar system, which is an important factor to the resolution. The mutual coupling of multiple parallel linear arrays, especially the mutual coupling of adjacent linear arrays is a significant phase error source. How to solve the above problem through the signal processing method has not yet been described in the existing technology, neither in the two patents nor in the paper as foregoing cited.

2. The receiving sonar array of high-resolution bathymetric sidescan sonar system consists of multiple equal spaced parallel linear arrays including sub-arrays, each sub-array having multiple array elements, wherein a good combination makes its error in the estimation of direction minimized. However, how to achieve the good combination is not yet disclosed neither in these two patents nor in the paper as foregoing cited.

Therefore, the invention provides a method of signal processing for high resolution bathymetric sidescan sonar system to mitigate or remove the aforementioned problems.

SUMMARY OF THE INVENTION

One aspect of the present invention is to provide a signal processing method for multi-sub-array and multi-subspace fitting to overcome the foregoing described disadvantages in the prior art.

For achieving the above objective, the present invention provides a method for processing high resolution bathymetric sidescan sonar signals including following steps:

a) obtaining all sub-arrays from all possible sub-array choices;

b) calculating arrival angle of each sub-array of each sub-array choice;

c) calculating variance of each arrival angle of each sub-array;

d) choosing one sub-array configuration that has the smallest standard deviation of the arrival angle estimation as the sonar system operation mode.

In the method as described above, the step a) further includes the following sub-steps:

1) obtaining an output signal X of the sonar array by removing initial and tail array elements, for a sonar array with a mutual matrix having a freedom degree of h, $h \geq 2$, presented through the following equation:

$$X = AGS + N \quad (3)$$

where $$X = [x_h \ x_{h+1} \ \cdots \ x_{L-(h-1)}]^T \quad (4a)$$

$$S = [s_1 \ s_2 \ \cdots \ s_M]^T \quad (4b)$$

$$A = \begin{bmatrix} 1 & 1 & \cdots & 1 \\ e^{j\phi_1} & e^{j\phi_2} & \cdots & e^{j\phi_M} \\ \vdots & \vdots & \ddots & \vdots \\ e^{j[L-(2h-1)]\phi_1} & e^{j[L-(2h-1)]\phi_2} & \cdots & e^{j[L-(2h-1)]M} \end{bmatrix} \quad (4c)$$

$$G = \mathrm{diag}\left\{\sum_{q=-(h-1)}^{h-1} b_{|q|} e^{j(q\phi_1)} g(\theta_1) \ \ldots \ \sum_{q=-(h-1)}^{h-1} b_{|q|} e^{j(q\phi_M)} g(\theta_M)\right\} b_0 = 1 \quad (5)$$

where M is the number of targets (signal sources), L is the number of array elements, N is zero mean spatial white noise, X and N are L−2(h−1) dimensional vector; A is the array manifold, signal S consists of M independent Gauss signals;

2) calculating an estimation of $\hat{R}$, the correlation function of the sonar system:

$$\hat{R} = \frac{1}{N} \sum_{n=1}^{N} X_n X_n^H \quad (6)$$

3) implementing the eigen-decomposition of $\hat{R}$:

$$\hat{R} = A G \hat{R}_S G^H A^H + \sigma^2 I = \hat{U}_S \hat{\Sigma}_S \hat{U}_S^H + \hat{U}_N \hat{\Sigma}_N \hat{U}_N^H \quad (7)$$

where $\hat{R}_S$ is an estimated signal correlation function, $\sigma^2$ is an estimated value of noise variance; $\hat{U}_S$ and $\hat{\Sigma}_S$ are estimated eigenvector and eigenvalue of the signal, respectively, $\hat{U}_N$ and $\hat{\Sigma}_N$ are estimated eigenvector and eigenvalue of noise, respectively; $(\ )^H$ represents conjugate transposition arithmetic; I is unit matrix;

4) obtaining the sub-array $$J_1 = [I_{l-1} \ 0]_{(l-1) \times l}, J_2 = [0 I_{l-1}]_{(l-1) \times l} \quad (8)$$

where $M < l \leq L - 2(h-1)$.

In the method as described above; the step b) includes the following sub-steps:

5) calculating the estimated eigenvector:

$$\hat{U}_{S1} = J_1 \hat{U}_S$$

$$\hat{U}_{S2} = J_2 \hat{U}_S \quad (9)$$

6) calculating the $\hat{\Psi}$ based on the estimated values $\hat{U}_{S1}$ and $\hat{U}_{S2}$ obtained from step 5, by a multi-sub-array subspace fitting algorithm in the presence of the mutual coupling:

$$\hat{\Psi} = (\hat{U}_{S1}^H \hat{U}_{S1})^{-1} \hat{U}_{S1}^H \hat{U}_{S2} \quad (10)$$

7) calculating $\hat{\Phi}$:

$$\hat{\Psi} = C^{-1} \hat{\Phi} C \quad (11)$$

where $$\hat{\Phi} = \mathrm{diag}\{e^{j\hat{\phi}_1} \ \ldots \ e^{j\hat{\phi}_M}\} \quad (12a)$$

$$C = G \hat{R}_S G^H A^H \hat{U}_S \hat{\Sigma}_S' \quad (12b)$$

$$\hat{\Sigma}_S' = \hat{\Sigma}_S - \sigma^2 I \quad (12c)$$

8) calculating estimated values of sound wave arrival angles $\{\hat{\theta}_1 \ \hat{\theta}_2 \ \ldots \ \hat{\theta}_M\}$ $$\hat{\theta}_i = \sin^{-1}(\hat{\phi}_i / kd) \ i = 1, 2, \ldots, M. \quad (13)$$

In the method as described above, the step c) further includes the following sub-steps:

9) when the snapshot number N exceeds 100, the estimation error of the multi-sub-array sub-space fitting algorithm $\{\hat{\phi}_i - \phi_i\}$ is a joint zero-mean Gaussian distribution the mean value and variance are:

$$E\{\hat{\phi}_i - \phi_i\} = 0 \quad (14a)$$

$$E((\hat{\phi}_i - \phi_i)^2) = \frac{\sigma^2}{2N} \mathrm{Re}\{(\rho_i^H \rho_i)([P^{-1}]_{i,i} + \sigma^2 [P^{-1}(A^H A)^{-1} P^{-1}]_{i,i})\}, \quad (14b)$$

respectively, where $i = 1, \ldots, M$;

$$P = G \hat{R}_S G^H \quad (15a)$$

$$\rho_i^H = [(A_1^H A_1)^{-1} A_1^H F_i]_i^{(\gamma)} \quad (15b)$$

$$F_i = [0 I_{l-1}] - e^{j\phi_i} [I_{l-1} 0] \quad (15c)$$

where $A_1 = [I_l \ 0] A$, $F_i$ is a matrix of $(l-1) \times l$, $[X]_i^{(\gamma)}$ represents the i-th row of the matrix X, $\hat{R}_S$ represents estimated value of the signal correlation function;

calculating the estimated standard deviations for the arrival angles of all pairs of sub-arrays based on the root of the mean-square error, and then calculating the arithmetic average for the estimated standard deviations of the arrival angles of all pairs of sub-arrays, so as to obtain a final standard deviation;

10) calculating a final estimated standard deviation of $\hat{\theta}_i$ by step 8 and 9;

11) repeating step 4 to step 10 for all possible sub-array choices, and obtaining all the final estimated standard deviations for all possible sub-array choices.

In the method as described herein above, in the step d), it further comprises a step of comparing all the standard deviations of all possible subarray choice obtained from step 11, and determining a subarray selection method that has the smallest standard deviation of the arrival angle, and selecting this subarray choice as the sonar operation mode.

The present invention has following two advantageous in comparison with the prior art:

(1) Differing from the conventional techniques which only restrain the mutual coupling between array elements through the sensor array system or else through the DOA signal processing method, the inventive method uses both of them to restrain the mutual coupling, so as to develop the sonar system with better performance. Advantageously( ), on one hand, the degree of freedom h for the mutual coupling of the sonar array is reduced as much as possible, so that the number of array elements needed to be removed is less; on the other hand, multi-subarray sub-space fitting techniques still has a good performance when there is mutual coupling between array elements.

(2) The invention shows that when the array elements number is fixed, no matter there is or not a mutual coupling between array elements, a combination of the subarrays which has a smallest phase estimation deviation exists, whereby this subarray combination can make the sonar system accurately estimate the target location.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
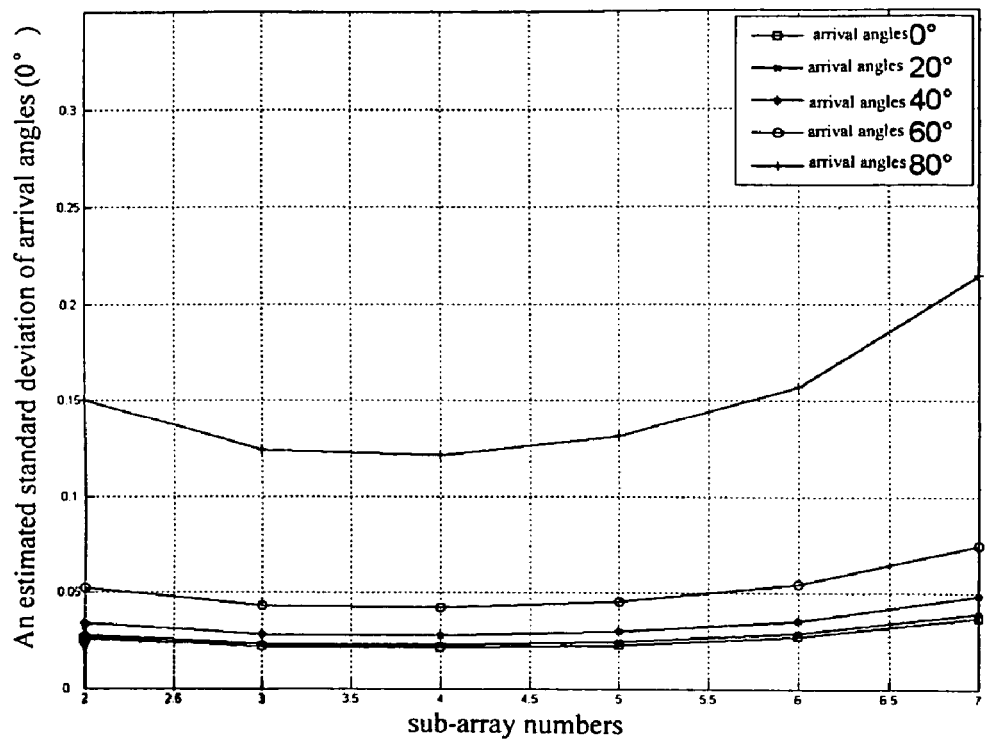
FIG. 1 is a diagram presenting the relationship between an estimated standard deviation of arrival angles and subarray numbers, showing the situation without mutual coupling existing between array elements, wherein the signal to noise ratio is 20 dB, the number of array elements is 8, the number of snapshots is 100, the signal source number is 1, and the arrival angle (from the top down) are 80°, 60°, 40°, 20° and 0° respectively.

The invention provides a DOA (Directions of Arrival) signal processing technique, which overcomes a problem of cross phase error of a sonar array caused by mutual coupling between linear array elements.

In a situation that a narrow band plane wave $s(t)$ arrives at a uniform linear receiving array consisting of L array elements, considering only the mutual coupling of adjacent array elements, the relationship of input $s(t)$ and output $x_i$ of the receiving array, $i=1 \ldots L$ can be presented in the following equation:

$$\begin{bmatrix} x_1 \\ x_2 \\ x_3 \\ \vdots \\ \vdots \\ x_{L-2} \\ x_{L-1} \\ x_L \end{bmatrix} = \begin{bmatrix} 1 & b_1 & 0 & 0 & 0 & 0 & \ldots & \ldots & \ldots & 0 \\ b_1 & 1 & b & 0 & 0 & 0 & \ldots & \ldots & \ldots & 0 \\ 0 & b_1 & 1 & b_1 & 0 & 0 & \ldots & \ldots & \ldots & 0 \\ \ldots & \ldots & \ldots & \ldots & \ldots & \ldots & \ldots & \ldots & \ldots & \ldots \\ \ldots & \ldots & \ldots & \ldots & \ldots & \ldots & \ldots & \ldots & \ldots & \ldots \\ 0 & \ldots & 0 & 0 & 0 & 0 & b_1 & 1 & b_1 & 0 \\ 0 & \ldots & 0 & 0 & 0 & 0 & 0 & b_1 & 1 & b_1 \\ 0 & \ldots & 0 & 0 & 0 & 0 & 0 & 0 & b_1 & 1 \end{bmatrix} \begin{bmatrix} 1 \\ e^{i\phi} \\ e^{i2\phi} \\ \vdots \\ \vdots \\ e^{i(L-3)\phi} \\ e^{i(L-2)\phi} \\ e^{i(L-1)\phi} \end{bmatrix} g(\theta)s(t) \quad (1)$$

where $g(\theta)$ is directivity of the linear array elements, all the linear array elements have a same $g(\theta)$, $b_1$ is a coupling factor representing the mutual coupling between the linear array elements, $\phi=kd\sin\theta$, k is the wave number, d is the distance between adjacent elements, $\theta$ is an arrival angle of the acoustic wave. The equation (1) only discusses the mutual coupling of the adjacent array elements while ignoring the noise effect. The first matrix at the right side of the equation (1) is a mutual coupling matrix B, where the nonzero element number in first row is called degree of freedom h of the mutual coupling matrix, in equation (1), h=2. Then the first and last row of the matrix B are removed to obtain an matrix $B_1$, a corresponding output of the linear array element is $x_i$, $i=2, \ldots L-1$. Then two subarrays in $i=2, \ldots L-1$ are selected randomly, each one subarray has a same amount of linear array elements. For example, when $i=2, \ldots L-2$ and $i=3, \ldots L-1$ are selected, then $$\begin{bmatrix} x_3 \\ x_4 \\ \vdots \\ \vdots \\ x_{L-2} \\ x_{L-1} \end{bmatrix} = \begin{bmatrix} b_1 & 1 & b_1 & 0 & \ldots & \ldots & \ldots & \ldots \\ 0 & b_1 & 1 & b_1 & \ldots & \ldots & \ldots & \ldots \\ \ldots & \ldots & \ldots & \ldots & \ldots & \ldots & \ldots & \ldots \\ \ldots & \ldots & \ldots & \ldots & \ldots & \ldots & \ldots & \ldots \\ \ldots & \ldots & \ldots & \ldots & \ldots & b_1 & 1 & b_1 & 0 \\ 0 & 0 & 0 & 0 & \ldots & \ldots & b_1 & 1 & b_1 \end{bmatrix} \begin{bmatrix} 1 \\ e^{i\phi} \\ e^{i2\phi} \\ \vdots \\ \vdots \\ e^{i(L-3)\phi} \\ e^{i(L-2)\phi} \end{bmatrix} g(\theta)s(t)e^{i\phi} \quad (2)$$

$$= \begin{bmatrix} x_2 \\ x_3 \\ \vdots \\ \vdots \\ x_{L-1} \\ x_{L-2} \end{bmatrix} e^{i\phi}$$

The equation (2) shows that without counting the first and last array elements, the receiving array is divided into two adjacent subarrays, each subarray has the same amount of array elements, so the output signal ratio of the two subarrays is $e^{i\phi}$, which is consistent with the result under a situation of no-mutual coupling sonar system. In other words, as the mean value $e^{i\phi}$ is the same no matter whether the mutual coupling exists or not according to the method of the present invention, it is a biasless( ) evaluation. The arrival angle $\theta$ is thus obtained from $\phi$. A glancing angle (wave to the bottom sea) $\alpha=\theta+\theta_m$, where $\theta_m$ is a mounting angle of the sonar system equal to an angle between the sonar array plane and the vertical earth plane.

Furthermore, the invention provides a method adopting a multi-subarray DOA signal processing technique, that is, with a given array element number, obtaining an optimized combination of the subarray number and the element number of each subarray, so as to enhance the precision level of the sonar measuring. For example, similar to the equation (2), i=2, . . . L−3, or 3, . . . L−2 or 4, . . . L−1 etc. is selected.

A method for processing high resolution bathymetric sidescan sonar signal in accordance with the present invention comprises following steps:

1) obtaining an output signal X, for a sonar system with a freedom degree h, h≧2, by removing the first and last array elements, as presented in following equation:

$$X = AGS + N \quad (3)$$

where $$X = [x_h \; x_{h+1} \; \cdots \; x_{L-(h-1)}]^T \quad (4a)$$

$$S = [s_1 \; s_2 \; \cdots \; s_M]^T \quad (4b)$$

$$A = \begin{bmatrix} 1 & 1 & \cdots & 1 \\ e^{j\phi_1} & e^{j\phi_2} & \cdots & e^{j\phi_M} \\ \vdots & \vdots & \ddots & \vdots \\ e^{j[L-(2h-1)]\phi_1} & e^{j[L-(2h-1)]\phi_2} & \cdots & e^{j[L-(2h-1)]M} \end{bmatrix} \quad (4c)$$

$$G = \text{diag}\left\{\sum_{q=-(h-1)}^{h-1} b_{|q|} e^{j(q\phi_1)} g(\theta_1) \; \cdots \; \sum_{q=-(h-1)}^{h-1} b_{|q|} e^{j(q\phi_M)} g(\theta_M)\right\} b_0 = 1 \quad (5)$$

where M is the number of targets (signal sources), L is the number of array elements, N is zero mean value for white noise in spatial domain, X and N are L−2(h−1) dimensional vector; A is the array manifold, signal S consists of M independent Gauss signals;

2) calculating an evaluation of $\hat{R}$, the correlation function of the sonar system:

$$\hat{R} = \frac{1}{N} \sum_{n=1}^{N} X_n X_n^H \quad (6)$$

3) implementing the eigen-decomposition of $\hat{R}$:

$$\hat{R} = AG\hat{R}_S G^H A^H + \sigma^2 I = \hat{U}_S \hat{\Sigma}_S \hat{U}_S^H + \hat{U}_N \hat{\Sigma}_N \hat{U}_N^H \quad (7)$$

where $\hat{R}_S$ is an estimated signal correlation function, $\sigma^2$ is an estimated value of noise variance. $\hat{U}_S$ and $\hat{\Sigma}_S$ are estimated eigenvector and eigenvalue of signal respectively, $\hat{U}_N$ and $\hat{\Sigma}_N$ are estimated eigenvector and eigenvalue of noise; H represents conjugate transposition arithmetic; I is a unit matrix.

4) obtaining the sub-array $$J_1 = [I_{l-1} \; 0]_{(l-1) \times l}, J_2 = [0 \; I_{l-1}]_{(l-1) \times l} \quad (8)$$

where M<l≦L−2(h−1);

the algorithm used in this step for obtaining the sub-array is the algorithm as disclosed in the paper (ref. 1);

5) obtaining a corresponding estimated eigenvector of the sub-array:

$$\hat{U}_{S1} = J_1 \hat{U}_S$$

$$\hat{U}_{S2} = J_2 \hat{U}_S \quad (9)$$

6) calculating the $\hat{\Psi}$ by a fitting arithmetic based on the estimated values $\hat{U}_{S1}$ and $\hat{U}_{S2}$ obtained from step 5:

$$\hat{\Psi} = (\hat{U}_{S1}^H \hat{U}_{S1})^{-1} \hat{U}_{S1}^H \hat{U}_{S2} \quad (10)$$

7) calculating $\hat{\Psi}$ through the following equations:

$$\hat{\Psi} = {}^{-1}\hat{\Phi}C \quad (11)$$

where $$\hat{\Phi} = \text{diag}\{e^{j\hat{\phi}_1} \; \cdots \; e^{j\hat{\phi}_M}\} \quad (12a)$$

$$C = G\hat{R}_S G^H A^H \hat{U}_S \hat{\Sigma}_S' \quad (12b)$$

$$\hat{\Sigma}_S' = \hat{\Sigma}_S - \sigma^2 I \quad (12c)$$

8) calculating estimated values of sound wave arrival angle $\{\hat{\theta}_1 \; \hat{\theta}_2 \; \cdots \; \hat{\theta}_M\}$ $$\hat{\theta}_i = \sin^{-1}(\hat{\phi}_i / kd) \; i = 1, 2, \ldots M \quad (13)$$

9) when the snapshots number N exceeds 100, the estimation error of the fitting algorithm $\{\hat{\phi}_i - \phi_i\}$ is a joint zero-mean Gaussian distribution the mean value and variance are:

$$E\{\hat{\phi}_i - \phi_i\} = 0 \quad (14a)$$

$$E((\hat{\phi}_i - \phi_i)^2) = \frac{\sigma^2}{2N} \text{Re}\left\{(\rho_i^H \rho_i) \left( \begin{matrix} [P^{-1}]_{i,i} + \\ \sigma^2 [P^{-1}(A^H A)^{-1} P^{-1}]_{i,i} \end{matrix} \right)\right\} \quad (14b)$$

respectively, where i=1 . . . , M;

$$P = G\hat{R}_S G^H \quad (15a)$$

$$\rho_i^H = [(A_1^H A_1)^{-1} A_1^H F_i]_i^{(\gamma)} \quad (15b)$$

$$F_i = [0 I_{i-1}] - e^{j\phi_i} [I_{i-1} \; 0] \quad (15c)$$

where $A_1 = [I_1, \; 0]A$, $F_i$ is a matrix of (l−1)×l, $[X]_i^{(\gamma)}$ represents the i-th row of the matrix X, $\hat{R}_S$ represents estimated value of the signal correlation function; $\{\hat{\phi}_i - \phi_i\}$ is a zero mean, which represents that the fitting algorithm of multi-array sub-space is a biasless evaluation, regarding the mutual coupling making no difference in the array in comparison with the absent of mutual coupling, then estimating standard deviations for the arrival angles of all sub-arrays, and further implementing arithmetic average for all, and obtaining a final standard deviation;

10) calculating a final estimated standard deviation of $\hat{\theta}_i$ by step 8 and 9;

11) repeating step 4 to step 10 for all possible sub-array choices, and obtaining all the estimated standard deviations for all possible sub-array choices.

12) comparing all the standard deviations of all possible sub-array choices obtained from step 11, and determining a sub-array choice that has a smallest standard deviation of the arrival angle, and choose it as the sonar operation mode.

In the foregoing step 1, if the targets are not coherent, the freedom degree h=2, the first and last array elements are removed to obtain a sonar array output X:

$$X = AGS + N$$

where $$X = [x_2 \; x_3 \; \cdots \; x_{L-1}]^T$$

$$S = [s_1 \; s_2 \; \cdots \; s_M]^T$$

-continued $$A = \begin{bmatrix} 1 & 1 & \cdots & 1 \\ e^{j\phi_1} & e^{j\phi_2} & \cdots & e^{j\phi_M} \\ \vdots & \vdots & \ddots & \vdots \\ e^{j(L-3)\phi_1} & e^{j(L-3)\phi_2} & \cdots & e^{j(L-3)\phi_M} \end{bmatrix}$$

$$G = \text{diag}\left\{ \sum_{q=-(h-1)}^{h-1} b_{|q|} e^{j(q\phi_1)} g(\theta_1) \ \cdots \ \sum_{q=-(h-1)}^{h-1} b_{|q|} e^{j(q\phi_M)} g(\theta_M) \right\} b_0 = 1$$

where L is array element number, N is zero mean spatial white noise, which is L−2 dimensional vector; A is the array manifold of the spatial array.

When the processing method of this invention is tested in the sea or lake, the following steps are implemented:
  A) emitting sonar pulse signal from the emitting system to the sea;
  B) receiving back scattered echo signals from the sea bottom;
  C) filtering and sampling the echo signals, and obtaining the output signal X represented in equation (3);
  D) repeating steps 4 to 10 in order to obtain all possible sub-array choices, and obtain all the estimated standard deviations for the all possible sub-arry choices;
  E) comparing all the standard deviations obtained from step D, and determining a sub-array choice that has the smallest standard deviation, and selecting this sub-array choice as the sonar operation mode.

Figure 3:
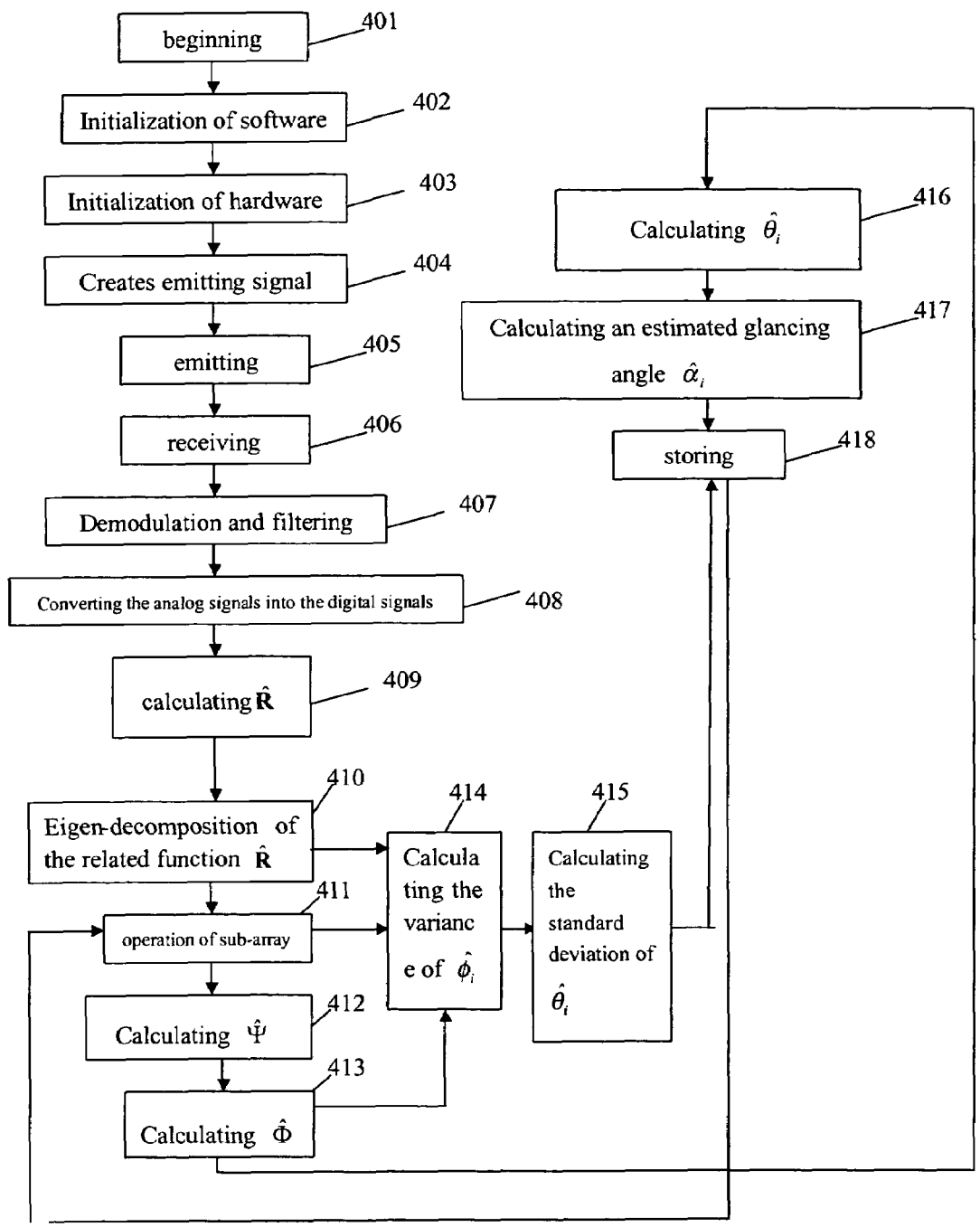
FIG. 3 is a flow diagram of a measuring process in accordance with one embodiment of the present invention.

The processing method of this invention is specially applied in the sonar system. Generally as a dedicated measuring program, which is installed in a host computer of the sonar system. A flow chart of the measuring process as shown in FIG. 3 is based on one embodiment of this invention. The $\hat{R}$, $\hat{\Psi}$, $\hat{\Phi}$, $\hat{\phi}$ has a same meaning as those in the embodiment of this invention. The program execution is as follow:

Step 401 is a beginning step, for starting the program and activating the sonar system.

Step 402 and 403: initialization of the software and the hardware of the sonar system.

Step 404: the main computer creates emitting signal.

Step 405: emitting sonar pulse signal to the water.

Step 406: receiving the backscatter signals from the sea.

Step 407: demodulation and filtering the echo signals.

Step 408: converting the analog echo signal into the digital signal, and implementing steps 409 to 413 for each echo signal.

Step 409: calculating an estimated value of the correlation function $\hat{R}_S$ Step 410: implementing the eigen-decomposition of the related function $\hat{R}_S$ Step 411: calculating estimated value of the eigenvector of the subarray;

Step 412: calculating $\hat{\Psi}$.

Step 413: calculating $\hat{\Phi}$.

Step 414: calculating the variance of $\hat{\phi}_i$

Step 415: calculating the standard deviation of $\hat{\theta}_i$

Step 416: calculating an estimated arrival angle $\hat{\theta}_i$

Step 417: calculating an estimated glancing angle $\hat{\alpha}_i$

Step 418: storing the standard deviation of $\hat{\theta}_i$ and $\hat{\alpha}_i$, and feedback to step 411, repeating step 411 to step 417, until all the sub-arrays are implemented, then select the sub-array that has the smallest standard deviation as the sonar operation mode.

The above steps 401 to 408 use conventional techniques in this area, so a detailed description is omitted. The rest steps 409 to 418 are calculated by the equation provided in the embodiment.

Now take one application embodiment as an example to describe the effectiveness of this invention.

Figure 2:
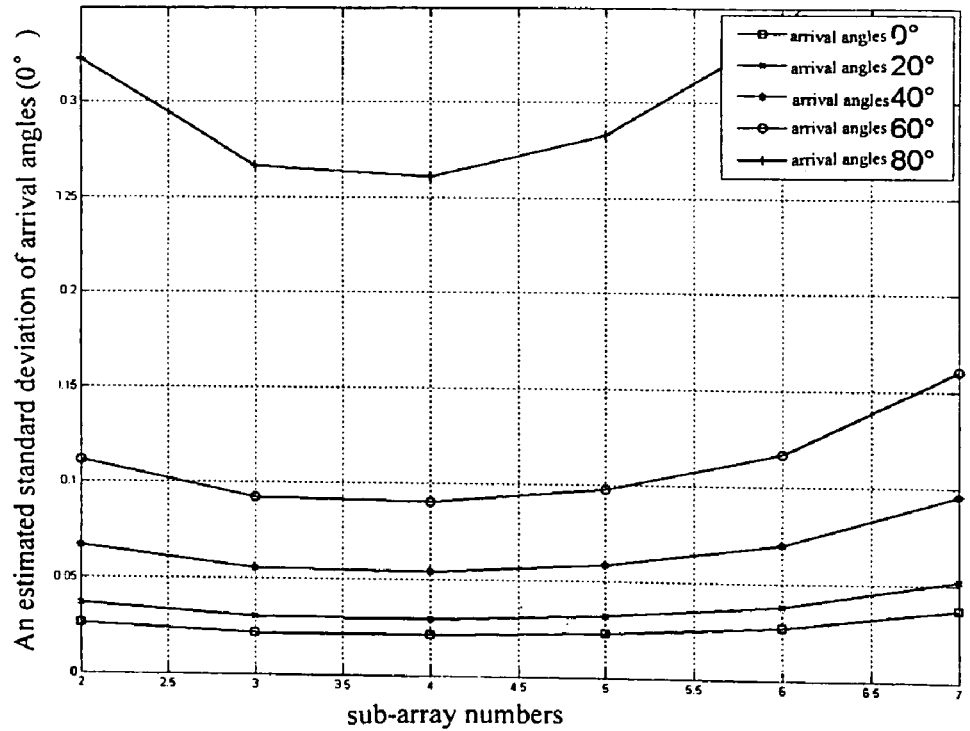
FIG. 2 is a diagram presenting the relationship between an estimated standard deviation of arrival angles and subarray numbers, showing the situation with mutual coupling existing between array elements, wherein the degree of freedom is 3, coupling coefficient $b_0=1$, $b_1=0.2\exp(j\pi/6)$, $b_2=0.05\exp(j\pi/5)$, signal to noise ratio is 20 dB, 8 array elements, snapshots is 100, 1 signal source, the arrival angle (from the top down) are 80°, 60°, 40°, 20° and 0° respectively.

By implementing step 1 to step 10 to obtain all the estimated standard deviation of all possible sub-array choices, the typical results are shown in FIG. 1 and FIG. 2. The relationship of the arrival angle and the sub-array number is represented in FIG. 1 and FIG. 2. In FIG. 1, there is no mutual coupling between array elements, the freedom degree h=1, array element number is 8, and signal source number M=1, g(θ)=1, the arrival angle is 80°, 60°, 40°, 20° and 0° in respective. FIG. 1 shows that the greater of the arrival angle, the greater of the estimated standard deviation, and a sub-array that has a smallest estimated standard deviation. FIG. 2 shows that there is mutual coupling between array elements, the degree of freedom h=3, $b_0=1$, $b_1=0.2e^{j\pi/6}$, $b_2=0.05e^{j\pi/5}$, the rest parameters are the same as that in FIG. 1. By implementing normalization to G, the maximum of its module is 1, wherein the 8 array number means the actual array number in the calculation, not counting the removed array elements. It can be seen from FIG. 2 that the estimated standard deviation of the arrival angle is little greater due to the mutual coupling, the greater of the arrival angle, the greater of the estimated standard deviation of the arrival angle is; there exists a sub-array that has a smallest estimated standard deviation.

In a situation that M=2 two targets are existing, the result is similar to the case of one target M=1.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for processing high resolution bathymetric sidescan sonar signals including steps of:
  a) obtaining all sub-arrays from all possible sub-array choices;
  b) calculating arrival angle of each sub-array;
  c) calculating variance of each arrival angle of each sub-array;
  d) choosing one sub-array choice that has a smallest standard deviation of the arrival angle as a sonar system operation mode.

2. A method for processing high resolution bathymetric sidescan sonar signal as claimed in claim 1, wherein the step a) in claim 1 includes sub-steps of:
  1) obtaining an output signal X of the sonar array by removing first and last matrix elements, for a sonar array with a mutual matrix having a freedom degree of h, h≧2, presented through a following equation:

$$X = AGS + N$$

where $$X = [\, x_h \ x_{h+1} \ \cdots \ x_{L-(h-1)} \,]^T$$

$$S = [\, s_1 \ s_2 \ \cdots \ s_M \,]^T$$

-continued $$A = \begin{bmatrix} 1 & 1 & \cdots & 1 \\ e^{j\phi_1} & e^{j\phi_2} & \cdots & e^{j\phi_M} \\ \vdots & \vdots & \ddots & \vdots \\ e^{j[L-(2h-1)]\phi_1} & e^{j[L-(2h-1)]\phi_2} & \cdots & e^{j[L-(2h-1)]\phi_M} \end{bmatrix}$$

$$G = \mathrm{diag}\left\{ \sum_{q=-(h-1)}^{h-1} b_{|q|} e^{j(q\phi_1)} g(\theta_1) \ \cdots \ \sum_{q=-(h-1)}^{h-1} b_{|q|} e^{j(q\phi_M)} g(\theta_M) \right\} b_0 = 1$$

where M is the number of targets (signal sources), L is the number of array elements, N is zero mean spatial white noise, X and N are L−2(h−1) dimensional vectors; A is the array manifold( ) of the spatial array, signal S consists of M independent Gauss signals;

2) calculating an estimation of $\hat{R}$, the correlation function of the sonar system:

$$\hat{R} = \frac{1}{N} \sum_{n=1}^{N} X_n X_n^H$$

3) implementing the eigen-decomposition to $\hat{R}$:

$$\hat{R} = AG\hat{R}_S G^H A^H + \sigma^2 I = \hat{U}_S \hat{\Sigma}_S \hat{U}_S^H + \hat{U}_N \hat{\Sigma}_N \hat{U}_N^H$$

where $\hat{R}_S$ is an estimated signal correlation function, $\sigma_2$ is an estimated value of noise variance; $\hat{U}_S$ and $\hat{\Sigma}_S$ are estimated eigenvector and eigenvalue of signal respectively, $\hat{U}_N$ and $\hat{\Sigma}_N$ are estimated value of eigenvector and eigenvalue of the noise; receptively, H represents conjugate transposition arithmetic; I is a unit matrix;

4) calculating the sub-array:

$$J_1 = [I_{l-1} 0]_{(l-1) \times l}, J_2 = [0 I_{l-1}]_{(l-1) \times l}$$

where M<l≦L−2(h−1).

3. A method for processing high resolution bathymetric sidescan sonar signal as claimed in claim 2, wherein the step b) includes sub-steps of:

5) calculating the estimated value of eigenvector through the following:

$$\hat{U}_{S1} = J_1 \hat{U}_S$$

$$\hat{U}_{S2} = J_2 \hat{U}_S$$

6) calculating the $\hat{\Psi}$ by a fitting algorithm based on the estimated values $\hat{U}_{S1}$ and $\hat{U}_{S2}$ obtained from step 5, considering the mutual coupling:

$$\hat{\Psi} = (\hat{U}_{S1}^H \hat{U}_{S1})^{-1} \hat{U}_{S1}^H \hat{U}_{S2}$$

7) calculating $\hat{\Phi}$ through the following equation:

$$\hat{\Psi} = C^{-1 \hat{\Psi}} C$$

where $\hat{\Phi} = \mathrm{diag}\{e^{i\hat{\phi}_1} \ \ldots \ e^{i\hat{\phi}_M}\}$ $$C = G\hat{R}_S G^H A^H \hat{U}_S \hat{\Sigma}_S'$$

$$\hat{\Sigma}_S' = \hat{\Sigma}_S - \sigma^2 I$$

8) calculating estimated values of sound wave arrival angle $\{\hat{\theta}_1 \ \hat{\theta}_2 \ \ldots \ \hat{\theta}_M\}$:

$$\hat{\theta}_i = \sin^{-1}(\hat{\phi}_i / kd) \ i = 1, 2, \ldots M.$$

4. A method for processing high resolution bathymetric sidescan sonar signal as claimed in claim 3, wherein the step c) includes the following sub steps:

9) when the snapshots number N exceeds 100, the estimation error of the multi-sub-array sub-space fitting algorithm $\{\hat{\phi}_i - \phi_i\}$ is a joint zero-mean gauss distribution, respectively, the mean value and variance are:

$$E\{\hat{\phi}_i - \phi_i\} = 0$$

$$E((\hat{\phi}_i - \phi_i)^2) \frac{\sigma^2}{2N} = \mathrm{Re}\{(\rho_i^H \rho_i)([P^{-1}]_{i,i} + \sigma^2 [P^{-1}(A^H A)^{-1} P^{-1}]_{i,i})\},$$

respectively, where i=1, . . . , M;

$$P = G\hat{R}_S G^H$$

$$\rho_i^H = [(A_1^H A_1)^{-1} A_1^H F_i]_i^{(\gamma)}$$

$$F_i = [0 I_{i-1}] - e^{j\phi_i} [I_{l-1} 0]$$

where $A_1 = [I_l \ 0]A$, $F_i$ is a matrix of (l−1)×l, $[X]_i^{(\gamma)}$ represents the i row of the matrix X, $\hat{R}_S$ represents estimated value of the signal correlation function;

Implementing arithmetic average for estimated standard deviations of arrival angles of all sub-array pairs, and obtaining this mean value as a final standard deviation;

10) calculating the final estimated standard deviation $\hat{\theta}_i$ by step 8 and 9;

11) repeating from the step 4 to step 10 to all possible sub-array choices, and obtaining all the estimated standard deviations of the arrival angels for all possible sub-array.

5. A method for processing high resolution bathymetric sidescan sonar signal as claimed in claim 4, wherein the step d) further comprises a sub steps of comparing all the standard deviations of all possible sub-array choices obtained from step 11, and determining a sub-array choice that has the smallest standard deviation of the arrival angle, and selecting this sub-array choice as the sonar operation mode.

\* \* \* \* \*